United States Patent
Thore et al.

(10) Patent No.: US 10,705,237 B2
(45) Date of Patent: Jul. 7, 2020

(54) METHOD OF CONSTRAINING AN INVERSION IN THE CHARACTERISATION OF THE EVOLUTION OF A SUBSURFACE VOLUME

(71) Applicant: Total S.A., Courbevoie (FR)

(72) Inventors: Pierre Daniel Thore, Pau (FR); Jonathan Anthony Edgar, Laurencekirk (GB)

(73) Assignee: Total S.A., Courbevoie (FR)

(*) Notice: Subject to any disclaimer, the term of this patent is extended or adjusted under 35 U.S.C. 154(b) by 382 days.

(21) Appl. No.: 15/324,400

(22) PCT Filed: Jul. 10, 2015

(86) PCT No.: PCT/EP2015/065909
§ 371 (c)(1),
(2) Date: Jan. 6, 2017

(87) PCT Pub. No.: WO2016/005598
PCT Pub. Date: Jan. 14, 2016

(65) Prior Publication Data
US 2017/0205522 A1    Jul. 20, 2017

(30) Foreign Application Priority Data

Jul. 11, 2014   (GB) ................... 1412401.0

(51) Int. Cl.
*G01V 1/30*    (2006.01)
(52) U.S. Cl.
CPC ........ *G01V 1/308* (2013.01); *G01V 2210/612* (2013.01)

(58) Field of Classification Search
CPC ..................................... G01V 1/308
See application file for complete search history.

(56) References Cited

U.S. PATENT DOCUMENTS 4,964,088 A    10/1990 Chittineni
8,705,317 B2    4/2014 Houck et al.
(Continued)

FOREIGN PATENT DOCUMENTS

EP    1865340 A1    12/2007
EP    1865340 B1    9/2010
(Continued)

OTHER PUBLICATIONS

Fomel et al., "Model Preconditioning by Plane-Wave Construction in Geophysical Estimation Problems," 2005 Annual Meeting SEG/Houston, pp. 2601-2604.
(Continued)

*Primary Examiner* — Manuel A Rivera Vargas
(74) *Attorney, Agent, or Firm* — Ross T. Robinson (57) ABSTRACT

Disclosed is a method for characterizing the evolution of a subsurface volume over time. The method comprises providing a first and second surveys of the reservoir with a first and second sets of seismic traces, performing an inversion to obtain estimates of changes having occurred between said first time and said second time in terms of at least one model parameter; wherein the subsurface volume is divided into regions according to a high order discrete classification attributed in accordance with the region's geologic characteristics, and said inversion is constrained per region of subsurface volume. The regions of subsurface volume may be geological layers.

18 Claims, 3 Drawing Sheets

(56) References Cited

U.S. PATENT DOCUMENTS

| | | | |
|---|---|---|---|
| 2003/0043693 A1 | | 3/2003 | Eastwood et al. |
| 2007/0259432 A1* | | 11/2007 | Zhao ................. G01V 1/42 436/25 |
| 2009/0043554 A1 | | 2/2009 | Horne et al. |
| 2010/0177595 A1* | | 7/2010 | Khare ................. G01V 1/28 367/73 |
| 2014/0019056 A1* | | 1/2014 | Thore ................. G01V 1/308 702/14 |
| 2016/0116637 A1* | | 4/2016 | Blanchard ............. G01V 1/306 703/2 |
| 2017/0205521 A1 | | 7/2017 | Thore et al. |
| 2017/0205522 A1 | | 7/2017 | Thore et al. |
| 2018/0003840 A1 | | 1/2018 | Blanchard et al. |

FOREIGN PATENT DOCUMENTS

| | | |
|---|---|---|
| GB | 2479347 A | 10/2011 |
| GB | 2514788 A | 12/2014 |
| GB | 2528129 A | 1/2016 |
| WO | WO-9964896 A1 | 12/1999 |
| WO | WO-0048022 A1 | 8/2000 |
| WO | WO-2010139998 A2 | 12/2010 |
| WO | WO-2012010790 A2 | 1/2012 |
| WO | WO-2012038647 A1 | 3/2012 |
| WO | WO-2016005597 A1 | 1/2016 |

OTHER PUBLICATIONS

Sun et al., "Separating Diffraction in 3D Plane-Wave Domain: A Physical Model Example," 2013 Annual Meeting SEG Houston, pp. 4049-4053.

Fernandes, Paulo, "International Search Report," prepared for PCT/GB2015/050008, dated Sep. 24, 2015, three pages.

Landro, Martin, et al., "Quantitative estimation of compaction and velocity changes using 4D impedance and traveltime changes," Geophysics, vol. 69, No. 4, Jul.-Aug. 2004, pp. 949-957.

Roste, Thomas, et al., "Estimation of layer thickness and velocity changes using 4D prestack seismic data," Geophysics, vol. 71, No. 6, Nov.-Dec. 2006, pp. S219-S234.

Herwanger, Jorg, et al., "Anisotropic velocity changes in seismic time-lapse data," Annual Meeting, SEG/San Antonio, Extended Abstracts, Sep. 2007, pp. 2883-2887.

Herwanger, Jorg, et al., "Linking reservoir geomechanics and time-lapse seismics: Predicting anisotropic velocity changes and seismic attributes," Geophysics, vol. 74, No. 4, Jul.-Aug. 2009, pp. W13-W33.

Fuck, R.F., et al., "Theory of traveltime shifts around compacting reservoirs: 3D solutions for heterogeneous anisotropic media," Geophysics, vol. 74, No. 1, Jan.-Feb. 2009, pp. D25-D36.

Vesnaver, Aldo L., et al., "Case History, Time-lapse tomography," Geophysics, vol. 68, No. 3, May-Jun. 2003, pp. 815-823.

Thomsen, Leon. "Weak Elastic Anisotropy," Geophysics, vol. 51, No. 10, Oct. 1986, pp. 1954-1966.

Migration in practice, Kirchhoff Migration, version 1.0 released Jan. 29, 1999, URL: http://www.xsgeo.com/course/mig.htm#kirk, Retrieved: Jan. 18, 2018.

Fernandes, Paulo, "International Search Report," prepared for PCT/EP2015/065909; dated Sep. 24, 2015, three pages.

U.S. Appl. No. 15/324,284, Thore et al.

Fernandes, Paulo, "International Search Report," prepared for PCT/EP2015/065908, dated Sep. 24, 2015, four pages.

Fomel, Sergey, "Applications of Plane-Wave Destruction Filters," Geophysics, vol. 67, No. 6, Nov. 2002, pp. 1946-1960.

* cited by examiner

METHOD OF CONSTRAINING AN INVERSION IN THE CHARACTERISATION OF THE EVOLUTION OF A SUBSURFACE VOLUME

The present invention relates generally to the field of geosciences and more particularly to seismic data processing. Specifically the invention relates to a method of constraining an inversion in the characterisation of the evolution of a subsurface volume.

In the oil and gas industry, seismic surveys are carried out in order to provide subsurface images so that accumulations of hydrocarbons or other fluids might be identified. In a seismic survey, one or several sources emit elastic waves in the form of pressure or ground motion modulation from specific locations (wavefield), at or below the land or sea surface or in a borehole. This wavefield propagates away from the source(s) through the subsurface. Along with this propagation, a fraction of the incident wavefield is reflected from the heterogeneities in the elastic material properties of the subsurface (such as acoustic impedance). This excitation by the incident wavefield generates a reflected wavefield from the heterogeneities, which manifests as pressure, particle motion or some derived quantities and can be detected and recorded at the surface or in a borehole at a number of receiver locations.

Processing of the measurements is undertaken so as to construct a 3D image of the subsurface. Repeated surveys at selected time intervals (days, months, years) allow observation of the changes in, over or under a given reservoir across the time interval—e.g. before oil or gas production starts and after some period of production or injection and to compare the results of measurements. This is called 4D seismic and involves comparing 2D or 3D seismic surveys carried out at different time instances. The aim is to observe changes in the state of the formations and fluids consequent upon production of hydrocarbons from or the injection of fluids into a reservoir. Proper detection of the changes and proper identification of the effects, factors and processes requires specialised acquisition techniques and data processing steps.

The data within the seismic data sets may be first processed to compensate for variations in acquisition (or non-repeatability of seismic surveys) and changes in velocity in the sub-surface.

In EP 1 865 340 to the Applicant, and incorporated herein by reference, the evolution of an oil reservoir in the process of producing is carried out by jointly inverting for the changes in the propagation times and seismic amplitudes of a seismic wavelet along propagation paths in the ground. Inverting allows to back filter, in effect, deriving the original from the solution. A base survey of the reservoir is provided, with a set of seismic traces at a first time T associated to a first velocity field $V_b$; a monitor survey of the reservoir is provided, the monitor survey being taken at a second time T+ΔT, with a set of seismic traces associated to the same positions as in the base survey; the monitor survey is associated to a second velocity field $V_m$. For a set of samples i in the base survey, one computes over the samples of the set the sum S of a norm of the difference between:
- the amplitude $b_i$ of the seismic trace in the base survey at each sample i and
- the sum of the amplitude $m_{i'}$ of the seismic trace at a time-corresponding i' in the monitor survey and the amplitude due to the reflectivity change local to the time-corresponding sample i' induced by the difference between the first velocity field $V_b$ and the second velocity field $V_m$; the time-corresponding sample i' being shifted in time by a time-shift derived from the velocity changes along the propagation path from the surface to time-corresponding sample i'. This sum is minimised to derive the velocity changes from the base survey to the monitor survey and thus characterise the evolution of the reservoir, the overburden and underburden.

This analysis is based on the fact that changes in the reservoir, due to exploitation, will cause changes to the petrophysical properties of the rock and therefore to the seismic velocity field. Practically, oil will be substituted by gas or water and/or the fluid pressure will change, modifying saturation, porosity, permeability and pressure, and consequently in velocity. Changes within the reservoir may also perturb the stress and strain state of the surrounding rocks, further altering their velocities. These changes to velocity will produce time shifts in the seismic response of underlying reflectors and associated changes in reflectivity, causing an alteration of the local wavefield. By using an inversion technique, for every point in the 3D volume, an estimate of the 4D changes having occurred in the time lapse between collection of the base and monitor surveys is provided. It is therefore possible to deduce a field of 4D velocity changes without having to proceed with cross correlation of the traces.

Although the 4D inversion problem appears relatively easy to formulate as the minimisation of a difference between base and monitor seismic data, it is an ill-posed problem that has multiple solutions: for instance, any smooth zero-mean velocity changes map into zero time-shift and does not generate any 4D amplitude difference. Moreover the inversion becomes even more highly non-linear for fields that induce subsidence and have potentially large time shift.

In EP 1 865 340, the crucial step is in minimising the difference between base and monitor seismics. Essentially this is an optimisation problem which requires minimising of the objective function or cost function over all choices of variables i.e. velocity changes that satisfy the modelled constraints. Usually the cost function is computed over all the available time-samples but it can be also calculated for decimated time samples or the sample number can be increased by interpolation to improve the accuracy of the solution.

Even greater difficulty is encountered when estimating time shifts in 4D seismic data in the overburden or underburden (that is in the regions above or below the reservoir). In these regions, a signal originates from the geomechanical effects and very weak amplitude change exists. These signals are much weaker, over much larger depth than signals from within the reservoir. Non-linear inversion (warping) techniques such as described above, can be used to address this problem, but struggle in handling this type of signal. Other techniques include local cross-correlation and image processing warping, but these techniques also have their drawbacks.

As in almost any inverse problem, this cost function does not go identically to zero. In fact the forward model used for this inversion, is just an approximation which implies some assumptions, and therefore a residual still exists. Moreover, noise in the data is quite high and sometimes of the same order of magnitude as the 4D signal. To partially overcome this problem a regularisation is applied to the inversion. However, it is difficult to choose an optimal regularization without having a detrimental impact on the magnitude and the localisation of the result in geomechanical modelling.

The regularization may comprise a combination of model energy damping, model smoothing and/or model sparsification, and is controlled by unintuitive weighting parameters. Several strategies can be used and a lot of interpretation is required, meaning that the solution is not unique. Particularly, in the case of overburden or underburden analysis, the nature of the signal, the ambient noise, and the very large number of unknowns in the inversion, means that the inversion is unstable without a very high level of regularisation.

It would therefore be desirable to improve regularisation when performing a 4D inversion.

SUMMARY OF INVENTION

In a first aspect of the invention there is provided a method for characterising the evolution of a subsurface volume over time, said method comprising:

providing a first survey of the reservoir with a first set of seismic traces corresponding to a first time;

providing a second survey of the reservoir with a second set of seismic traces corresponding to a second time;

performing an inversion to obtain estimates of changes having occurred between said first time and said second time in terms of at least one model parameter;

wherein said subsurface volume is divided into regions according to a high order discrete classification attributed in accordance with the region's geologic characteristics, and said inversion is constrained per region of subsurface volume.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1A:
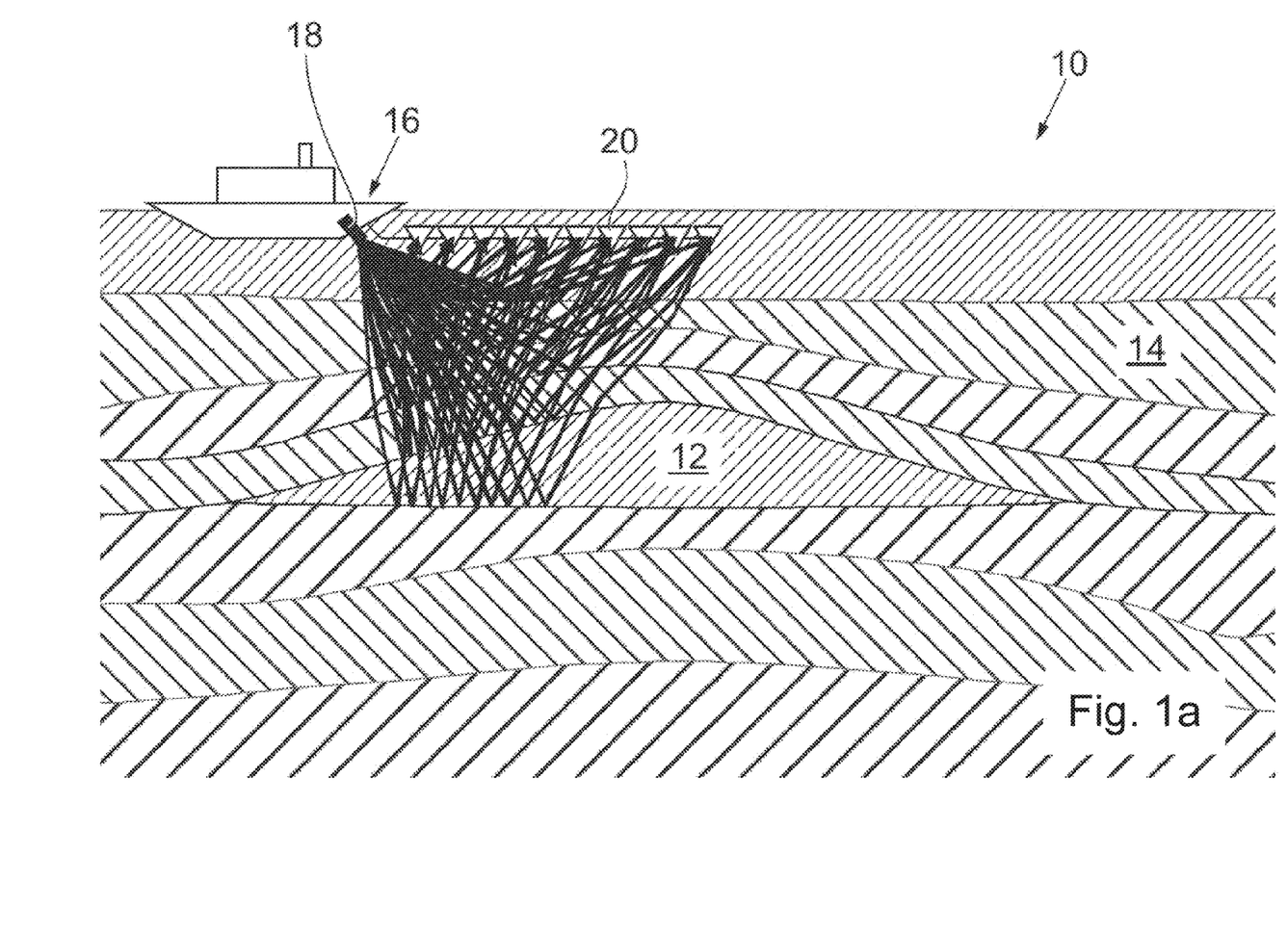
FIGS. 1a and 1b are schematic illustrations of respectively, a base survey and a monitor survey being performed.
Figure 1B:
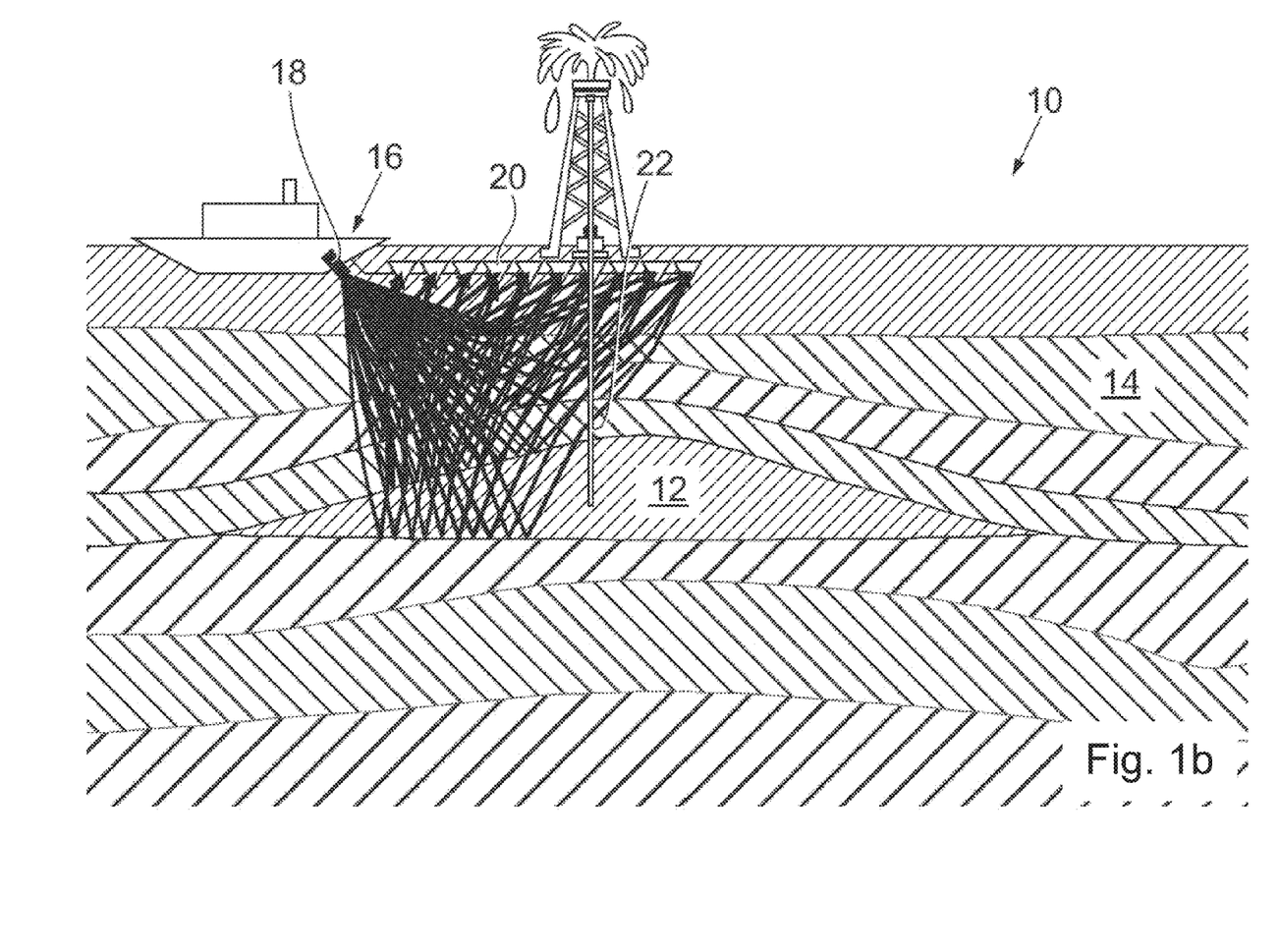

Referring initially to FIGS. 1a and 1b there is illustrated a reservoir, generally indicated by reference numeral 10, containing hydrocarbons 12 in the sub-surface 14. A survey vessel 16, upon which is located a sonar transmitter 18, being an acoustic source, and an array of receivers 20, performs a survey by travelling over the reservoir 10. The first or initial survey, FIG. 1a, may be referred to as a base survey and is typically performed in the exploration phase before production begins.

The base survey of the reservoir 10 provides a set of seismic traces at a first time T. For a given trace, the base survey provides amplitudes that are a function of time. With digital recording and processing the trace is sampled at a set of values; typical trace lengths correspond to around 1000 samples. The trace is then handled as a set of values.

One or more wells 22 may be drilled in order to extract the hydrocarbons 12. As the reservoir 10 is produced, hydrocarbons will be substituted by other fluids and the fluid pressure will change. Additionally, enhanced oil recovery techniques may be applied wherein a fluid is injected into the reservoir at one or more locations giving changes in fluid pressure and saturation. Changes within the reservoir (especially pressure changes) will change the stress state inside the reservoir and may also change the stress and strain state of the surrounding rocks. Thus when a further survey is carried out, FIG. 1b, these changes will be seen due to a consequential change in the velocity field. These changes to velocity will produce time shifts in the seismic expression of underlying reflectors and associated changes in reflectivity, causing a change in the local wavefield.

Thus reservoir monitoring performs a monitor survey of the reservoir 10, taken at a second time T+ΔT, with a set of seismic traces. In the simplest assumption, ΔT is a positive quantity, and the monitor survey is taken at a time later than the base survey; however, the order in which the surveys are taken is irrelevant to the operation of the process of the invention and, in principle, the time lapse ΔT could as well be negative—which amounts to comparing the earlier survey to the later one. As for the base survey, a sampled trace in the monitor survey is represented as a set of values.

Ideally, the traces in the monitor survey are associated to the same positions as in the base survey. This is carried out by using, inasmuch as possible, the same equipment, acquisition geometry and processes for running the base and monitor surveys. Techniques such as interpolation may be used where traces in the monitor survey and in the base survey do not fulfil this condition.

4D time shifts in the over-burden and sub-reservoir can be caused by production related geomechanical changes. Estimating such time shifts from 4D seismic data is important for calibrating geomechanical models. This calibration can be achieved by deriving the fractional change in travel-time ('time strain') from 4D time shifts, and assuming a relationship between time strain, velocity change and true vertical strain. The estimation of time strain is crucial, but complicated by relatively weak geomechanical signals in the overburden and sub-reservoir (compared to the 4D signal in a reservoir due to changes of pressure and saturation). It is therefore very difficult to correctly estimate its magnitude and locality.

Time shifts induced by geomechanical effects accumulate through the overburden, making the time shift at a particular point equal to the sum of the travel-time difference due to velocity and depth changes at all points above. Methods reliant on local cross-correlation are either overly sensitive to noise (if the correlation window is small) or provide poorly localized results (if the correlation window is large) and are therefore ill-suited for calibrating geomechanical models. Dynamic time warping methods estimate local time shifts sample-by-sample and are extremely sensitive to noise. They too are poorly suited for calibrating geomechanical models.

Non-linear inversion, often referred to as warping, is a known technique for estimating time shifts from 4D base and monitor survey data in the overburden. An iterative solver is used to find a minimum (with respect to time shifts) of an objective function of the form $E=\|b-f(\Delta t)\|_p$. The vector b contains the base traces, the vector Δt is the time shift estimate and the non-linear function f(Δt) applies Δt to the monitor traces. To solve for Δt involves linearizing f(Δt)

around a Δt estimate and solving for an incremental Δt update. Linearization of the function f(Δt) requires calculating its time derivative at each iteration. The inversion should be regularized in order to converge to a stable solution.

Non-linear inversion for time shifts can be directly parameterized in terms of relative interval velocity change or time strain, thereby implicitly providing cumulative time shift solutions. However, solving for time strain is less stable and more noise prone than solving for local time shifts. Significant inversion regularization is required which can have a detrimental impact on the magnitude and the localisation of the result in geomechanical modelling. This regularization is typically a combination of model energy damping, model smoothing and/or model sparsification, and is controlled by unintuitive weighting parameters.

In order to regularize inversion of 4D differences induced by geomechanical changes, it is proposed to apply constraints per region of subsurface volume, the regions defined according to a high order discrete property (e.g. geomechanical facies) attributed thereto in accordance with the region's geologic characteristics. Regions attributed with the same high order discrete property can be assumed to have similar geomechanical properties.

One way of applying constraints per region defined according to a high order discrete property is to define velocity changes (or time stain or time shifts depending on the chosen parameterization) as a regional function defined by a limited number of parameters at each position per region (e.g. layer or group of layers) used in geomechanical modelling. Geological surfaces can be used to divide the model space into layers (or strata) of geomechanical facies (rocks with similar geomechanical properties). Coefficients of a regional function are then inverted for at each spatial location within a layer. The regional function describes how a (e.g. elastic) model parameter, such as time strain, varies within each region (e.g. layer). The inversion forward modelling operator includes the regional function, which expands the coefficients at each spatial location into the desired property, such as time strain, at every seismic sample point within the region/layer. Determination of layer positions (through geological interpretation) does not need to be very accurate for measurements within the overburden/underburden as the wavelength of the geomechanical property variation are very long.

A simple example of a regional function is constant time strain per region or layer, in which case only a single coefficient is required at each spatial location within a region/layer. However other regional functions may also be appropriate depending on the subsurface geology. Therefore the constraint enables inversion within each region or layer using any function. The example below explains this method of geological constraints applied to an inversion for time strain from noisy 4D seismic, but the regularization method is general to any 4D seismic inversion (for geomechanical or elastic properties).

A non-linear inversion for time shifts can be constructed using an objective function of the form $E=\|b-f(\Delta t)\|_p$. The vector b contains the base traces, the vector Δt is the time shift estimate and the non-linear function $f(\Delta t)$ applies Δt to the monitor traces. The system of equations solved at every non-linear iteration can be written as:

$$GC\mu_n = f(\Delta t_n) - b \qquad (1)$$

The matrix G is the Jacobian of the function $f(\Delta t_n)$ at non-linear iteration n. The matrix C performs integration (scaled by the time sampling) of the time strain $\mu_n$ (to convert to time shifts). It is because $\mu_n$ is defined at every sample point that this inversion is unstable.

Introducing geological layer constraints into equation (1) gives:

$$GCL\hat{\mu}_n = f(\Delta t_n) - b \qquad (2)$$

The new model parameters $\hat{\mu}_n$, are layer-dependent or region-dependent coefficients of a function L, which is evaluated at every sample point. Geological surfaces are used to define the regions/layers of geomechanical facies; rocks that can be assumed to have similar geomechanical properties. For this specific example the constraint is that time strain is constant within each layer, but any region- or layer-dependent function could be expressed by $L\hat{\mu}_n$.

For the case of constant time strain per layer, model parameters $\hat{\mu}_n$ comprise a single time strain value at each spatial location per layer. The mapping operator L, for each trace location is built of N matrix blocks, each with N columns, where N is the number of layers. The number of rows per block varies according to the number of z-samples in the corresponding layer. Each block has a single column of ones, which is found in the first column for the first block, the second column for the second block, and so on. All other elements are zero. The final matrix, L, is a vertical concatenation of the blocks.

A significant advantage of using geological constraints when inverting 4D seismic is the ability to stabilize the inversion without using physically unrealistic regularization methods with unintuitive weighting parameters. Using geological surfaces to segregate the model space into layers of geomechanical facies allows inversion for a small number of coefficients per layer at each spatial location which define the model parameter variation. Layer-dependent rock mechanics relationships are incorporated directly into the inversion. This is in contrast to existing methods which invert for properties at every sample point, and stabilise the process by smoothing, sparsifying or limiting the energy of the model space; all of which create a trade-off between an unstable or over-regularized result. Unlike existing regularization methods, geological constraints are directly related to prior knowledge of subsurface geomechanics. Using geological surfaces to constrain the inversion also helps to impose discontinuities where they are expected; at the boundaries of geomechanical facies.

Using geological constraints does not preclude the use of the traditional regularization methods. Inverting noisy 4D seismic may require additional model energy damping or smoothing. Combining such regularization with geological constraints ensures its effect is consistent with geological layering. This is particularly advantageous when regularizing towards a spatially smooth solution; without geological layering smoothness is enforced horizontally (often conflicting with structural dip), while geological layering ensures the smoothness constraint follows layer dip by construction. Similarly, such an inversion will naturally take into account any fault, dip or similar anomaly. Therefore the throw of two stratigraphically neighbouring points on either side of a fault will be honoured.

A practical advantage of using geological constraints is the decreased computational cost of solving the inverse problem due to the vastly reduced model space. Without using layers to constrain the inversion, the inverted model size is the product of the number of inlines, crosslines and z-samples. Using layers the model size is the product of the number of inlines, crosslines, layers and model coefficients per layer. Noting that there are many z-samples per layer, this represents a very large saving.

Figure 2A:
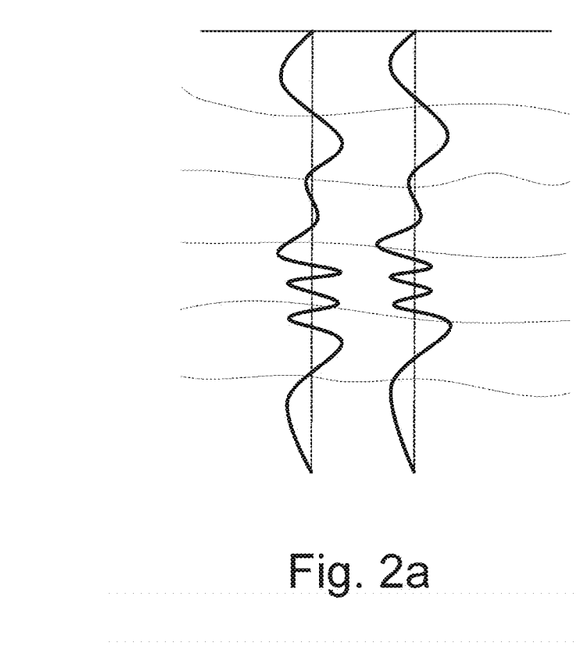
FIG. 2a shows two traces from a classical inversion.
Figure 2B:
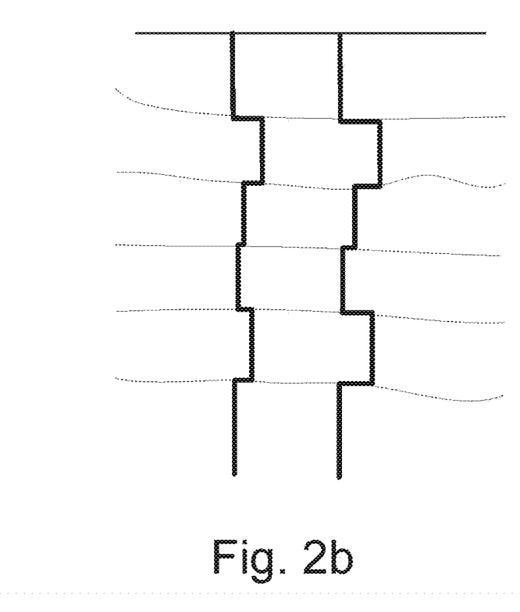
FIG. 2b shows two traces from an inversion constrained according to a method of the invention.

This saving is illustrated in FIGS. 2a and 2b. FIG. 2a shows two traces following inversion by a classical method. The inversion needs to be performed for each sample point, of which there can be thousands per trace. While the layers are shown in FIG. 2a, they are not used in classical inversion. FIG. 2b shows the inverted traces with the inversion constrained according to the teaching disclosed herein. In this example, the constraint is that the parameter is constant per layer. Consequently there is only one parameter to invert for per layer, per trace. It should be appreciated that the result of the inversion for each layer is not simply an average of the values within a layer following classical inversion, as the classical inversion results will have been skewed by the regularization necessary to stabilise the inversion.

A number of specific examples of the basic concept of regularising the inversion according to layer or facies region will now be provided. The first of these is related to Propagation 4D techniques as disclosed in WO2012/038647, which is hereby incorporated by reference. This document describes methods for the estimation of (e.g. elastic) model parameters (such as density, pressure and/or shear wave propagation velocity) in pervious layers located in a dense underground area along an array of horizontal positions, by inverting 4D seismic data. This inversion is layer based, whereby one or several seeds are provided (generally using Cal4D as described in WO2012/010790 herein incorporated by reference) with a set of layers and an estimation of the changes of model parameters in each layer. By using the seeds as an initial solution, the Propagation 4D method inverts for the position of the layers and the values of the changes of each model parameters at the neighbouring traces around the seeds.

Propagation 4D is typically performed to measure parameters within a reservoir, rather than the overburden. It typically uses an inversion to find layer positions. It uses knowledge from a previous trace to invert for changes in the next trace (spatially). Therefore, beginning with known positions of layers of a first trace, an inversion is performed to find the layer positions of the next trace (which should not have changed much). Then using this next trace, the layer positions of the next trace is inverted for, and so on.

The Propagation 4D method for estimating model parameters of a region of the subsoil meshed according to a network of horizontal positions comprises the following steps, according to an embodiment:

(a) measuring, in a first phase, base seismic traces associated with said horizontal positions;

(b) measuring, in a second phase, monitor seismic traces associated with said horizontal positions and corresponding to the base seismic traces;

(c) obtaining an estimate of the variations of model parameters between the first and the second phases in permeable layers of the subsurface in at least one starting position of the network, the model parameters including a density and a speed of propagation of a pressure wave in each of said permeable layers;

(d) determining a boundary consisting of the positions of the network which are adjacent to a starting position;

(e) estimating, at each position of the boundary, the variations of the model parameters in the permeable layers and/or the depths and/or thicknesses of said permeable layers by minimizing a cost function derived from a seismic wave propagation model accounting for the evolution between the base and monitor seismic traces associated with said position of the boundary, the minimization taking into account the variations estimated at the adjacent starting position, and marking each position of the boundary as having been processed;

(f) removing from the boundary any position where the minimized cost function exceeds a limit value;

(g) selecting at least one propagation position in the boundary, where the minimized cost function has, within the boundary, a minimal value, then removing the selected propagation position from the boundary;

(h) adding to the boundary each position of the network not marked as processed and adjacent to a propagation position selected in the preceding step (g);

(i) estimating, at each position added to the boundary in the preceding step (h), the variations of the model parameters in the permeable layers and/or the depths and/or thicknesses of said permeable layers by minimizing the cost function derived from the seismic wave propagation model accounting for the evolution between the base and monitor seismic traces associated with said position added to the boundary, the minimization taking into account the variations estimated at the selected propagation position, and marking each position added to the boundary in the preceding step (h) as having been processed;

(j) removing from the boundary any position added in the preceding step (h) where the minimized cost function exceeds the limit value; and (k) repeating from step (g) if the boundary still contains at least one position adjacent to a position of the network not marked as processed.

The Propagation 4D algorithm described above makes it possible to evaluate, step by step, the model parameters and/or the geometry of the layers. The propagation is performed in such a way as to retain the best possible results for the inversion with limited perturbations of the model. The propagation stops when the assumption of relative continuity of the values of the parameters is no longer in agreement with the measurements.

The Propagation4D and Cal4D algorithms, as disclosed in the aforementioned documents, require strong changes of (e.g. elastic) model parameters between layers, which correspond to high frequency amplitude variation of the seismic signal at the layer boundaries. These methods are therefore presently not suited for estimating time strains in the overburden, which are weak and essentially continuous.

It is proposed to use geological layer or region constraints, consistent with layers or subsurface regions as used in geomechanical modelling, to define and fix the layer positions within the Propagation4D method. As already mentioned, geological surfaces divide the model space into layers of geomechanical facies; rocks that can be assumed to have similar geomechanical properties. Coefficients of a regional function are inverted for at each spatial location within a layer. The inversion forward modelling operator expands the coefficients at each spatial location per layer (or region) into some desired property (such as time strain or relative velocity change) at every seismic sample point within the layer (or region), in accordance with the regional function. The example below explains this method of geological constraints applied to the Propagation4D method for inverting time strain from noisy 4D seismic, but the regularization method is general to any 4D seismic inversion (for geomechanical properties).

A non-linear inversion for time shifts can be constructed using an objective function of the form:

$$J_{BM} = \frac{\sqrt[j]{\frac{\sum_n (B_n - MB_n)^j}{N}}}{\sqrt[j]{\frac{\sum_n (B_n - MB_n)^j}{N}}} \quad (3)$$

where $J_{BM}$ is the coherency function between the base B and the monitor M computed over the number of samples N. MB is the monitor warped into the base by the non linear function f defined in equation (2) which, in this case, can be expressed as:

$$MB = f(\Delta t_n) = M\left(nt_s - \left(\sum_{l=1}^{L} \Pi_0^{nt_s}(T_l - T_{l-1})\frac{\Delta v_p}{v_{p_l}}\right)\right). \quad (4)$$

The vector M contains the monitor traces, the vector $$\frac{\Delta v_p}{v_{p_l}}$$

is the velocity change (related to time strain) estimate in each layer 1. $\Pi_0^{nt_s}$ represents a box function with values of 1 between [0, $nt_s$] and 0 outside, with n being the sample number and $t_s$ being the time sampling interval. Compared to classical Propagation 4D, the most important point to notice here is that the limits of the layers $T_1$, $T_{l-1}$ are no longer parameters of the equation, but are prior information corresponding to the geological constraint.

It should be noted that equation (4) shows the inversion being constrained to a constant value function for variation of velocity per layer. However, as before, it is possible to introduce any function other than this.

In some cases it is possible to mix this approach (where layer positions are given) with some uncertainty on the position of certain layers (e.g. in the reservoir), such that the amplitude term drives the accurate estimation of the layer positioning.

Another method disclosed in a patent application having agent's reference P166099.GB.01, filed the same day as this application (to the same applicant) discloses a fast non-linear inversion method for estimating 4D time shifts and time strain. This method is fundamentally different in construction to those described above, as the inversion is cast as a phase-only plane wave filter design problem. These filters are described analytically, making inversion for their coefficients fast and efficient.

The method discloses:
providing a first survey of the reservoir with a first set of seismic traces corresponding to a first time;
providing a second survey of the reservoir with a second set of seismic traces corresponding to a second time;
constructing an analytic filter operable to shift one or more seismic traces in dependence of a time varying parameter (such as time shift, time strain or velocity change); and
performing an inversion to obtain estimates of the time varying parameter such that the analytic filter aligns the first survey and the second survey.

The analytic filter may comprise a plane wave destruction filter, and may be a time domain analogue of a frequency domain phase shift operator operable to impose a constant time shift to a plane wave model of a seismic trace. The analytic filter may be such that the time varying parameter is a function of the analytic filter instead of being a function of one or more of the second set of seismic traces.

The method may comprise the steps of:
constructing the analytical filter and their derivatives from a current time varying parameter model; and
iteratively updating an initial time varying parameter estimate with an incremental time varying parameter update until convergence on a solution by:
applying the analytical filter to at least one of the first survey and the second survey to generate residuals;
building a Jacobian matrix by applying the filter derivatives to the first survey and the second survey and diagonalizing the result; and
iteratively solving a linear inverse function constructed from the residuals and the Jacobian matrix.

The implementation of time strain inversion using plane wave filters described in the aforementioned document estimates a single time strain value at each seismic sample point, with a weak 3D correlation enforced between sample points. The stability of this method relies on signal variation between samples being significantly larger than the noise. This is often not the case in the overburden where time strains are weak and approximately continuous. Consequently it is proposed to constrain this inversion using the techniques described herein, that is to use geological layer or region constraints, consistent with layers or subsurface regions as used in geomechanical modelling, to divide the model space into layers/regions of geomechanical facies.

The unregularized objective function to be minimised may take the form:

$$E = \|L(-\Delta t)b - L(\Delta t)m\|_2 \quad (5)$$

where L is a non-stationary, phase-only filter parameterised by vector $\Delta t$ representing all the time shifts. It should be noted that Equation (5) shifts both sets of base and monitor traces by equal amounts in opposite directions, bringing them to common midpoints in time. This is optional, and shifting the monitor to the base, or indeed the base to the monitor, is envisaged within the scope of this disclosure. Making the substitutions: $C_p = [L(-\Delta t_p) - L(\Delta t_p)]$, $$d_p = -C_p\begin{bmatrix}b\\m\end{bmatrix}, \; G_p = \text{diag}\left\{C'_p\begin{bmatrix}b\\m\end{bmatrix}\right\}$$

and $u_p = \nabla_z \Delta t_p$ equation (1) can be linearized to give:

$$G_p t \nabla_z^{-1} \delta u_p = d_p \quad (6)$$

Equation (6) is solved iteratively for an incremental time strain perturbation, $\delta u_p$, where p is the iteration number. The matrix C' is constructed from the partial derivatives of the filter coefficients with respect to $\Delta t$. The operator, $\nabla$, produces the gradient in the direction specified by the accompanying subscript. Naturally, the inverse of this operator performs integration. The scalar, t, is the time sampling interval of the 4D data.

Introducing geological layer constraints into equation (2) gives:

$$G_p t \nabla_z^{-1} H \delta \hat{\mu}_p = d_p \quad (7)$$

The new model parameters, $\hat{\mu}$, are layer-dependent coefficients of a function, H, which is evaluated at every sample point. Geological surfaces are used to define the layers of geomechanical facies; rocks that can be assumed to have similar geomechanical properties. The simplest expression of this constraint is that time strain is constant within each layer, but any layer-dependent rock mechanics relationships could be expressed by $H\hat{\mu}$.

For the case of constant time strain per layer, $\hat{\mu}$ is a single time strain value at each spatial location per layer. The mapping operator, H, for each trace location is built of N matrix blocks, each with N columns, where N is the number of layers. The number of rows per block varies according to the number of z-samples in the corresponding layer. Each block has a single column of ones, which is found in the first column for the first block, the second column for the second block, and so on. All other elements are zero. The final matrix, H, is a vertical concatenation of the blocks. Under these circumstances the action of $\nabla_z^{-1}H$ can be expressed by:

$$\delta t(T) = \delta u(J)\left(T - \sum_{j=1}^{J-1} x(j)\right) + \sum_{j=1}^{J-1} \delta u(j)x(j) \quad j | j \in \mathbb{N}, \ j \leq J \quad (8)$$

Where $\delta t(T)$ is the incremental time shift at two way time T, $\delta\hat{\mu}(j)$ is the time strain in layer j, x(j) is the time thickness of layer j, and the index j runs from one up to the layer J in which time T exists.

Equation (7) can be further regularized using classical Tikhonov methods to give:

$$\begin{bmatrix} G_p t \nabla_z^{-1} H \\ \lambda_j \nabla_j \\ \lambda_x \nabla_x \\ \lambda_y \nabla_y \end{bmatrix} \delta\hat{u}_p = \begin{bmatrix} d_p \\ 0 \\ 0 \\ 0 \end{bmatrix} \quad (9)$$

It is important to note that the lateral smoothing action of $\lambda_x\nabla_x$ and $\lambda_y\nabla_y$ in equation (9) takes place within geological layers by construction, thereby following layer dip. The vertical smoothing governed by $\lambda_j\nabla_j$ occurs across layer boundaries and guards against the estimated model parameters swinging (successive over- and under-estimation) from one layer to the next. This constraint is not applied for reservoir layers. Equation (9) can be used to estimate layer-dependent overburden and sub-reservoir geomechanical properties (such as time strain) which vary smoothly in 3D, while honoring the a priori layering scheme.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects of surveillance, monitoring, optimisation and prediction of a subsurface volume comprising a hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method for characterising the evolution of a subsurface volume over time, said method comprising:
   providing a first survey of the subsurface volume with a first set of seismic traces corresponding to a first time;
   providing a second survey of the subsurface volume with a second set of seismic traces corresponding to a second time;
   performing an inversion to obtain estimates of changes having occurred between said first time and said second time in terms of at least one model parameter; and
   wherein said subsurface volume is divided into regions according to a high order discrete classification attributed in accordance with the region's geologic characteristics, and said inversion is constrained per region of subsurface volume.

2. The method as claimed in claim 1, wherein said inversion comprises inverting for coefficients of a regional function at each spatial location within a region, wherein said regional function describes how the model parameter varies within a region.

3. The method as claimed in claim 2 wherein said coefficients of the regional function are region-dependent coefficients, said region-dependent coefficients being dependent on the region of subsurface volume they correspond to.

4. The method as claimed in claim 2 wherein said regional function comprises a forward modelling operator imposing a region-dependent constraint, said region-dependent constraint being dependent on the region of subsurface volume.

5. The method as claimed in claim 4 wherein said forward modelling operator expands the coefficients of the regional function at each spatial location to every seismic sample point within the region.

6. The method as claimed in claim 4 wherein the region-dependent constraint is that the model parameter is constant within each region.

7. The method as claimed in claim 1 further comprising:
   constructing an analytic filter operable to shift at least one seismic trace in dependence of a time varying parameter; and
   performing the inversion to obtain estimates of the time varying parameter such that the analytic filter aligns the first survey and the second survey.

8. The method as claimed in claim 7 wherein the analytic filter comprises a plane wave destruction filter, and is a time domain analogue of a frequency domain phase shift operator operable to impose a constant time shift to a plane wave model of a seismic trace.

9. The method as claimed in claim 7 wherein the analytic filter is such that the time varying parameter is a function of the analytic filter instead of being a function of at least one of the second set of seismic traces.

10. The method as claimed in claim 7, wherein the inversion is further regularized spatially in two directions substantially parallel with the surface, and regularized in the direction normal to the surface across region boundaries only, and not within the regions.

11. The method of claim 7, wherein the time varying parameter is one of time shift, time strain, and velocity change.

12. The method as claimed in claim 1 wherein said regions of subsurface volume comprise geological layers.

13. The method as claimed in claim 1 wherein said high order discrete classification comprises facies.

14. The method as claimed in claim 1 wherein the model parameter is one of time strain, time shift or relative velocity change.

15. The method as claimed in any of claim 1 wherein said inversion is performed with layer positions of said subsurface volume being predetermined and fixed; the inversion being performed to obtain estimates of changes between layers, according to a function describing the expected model parameter change within each layer.

16. The method as claimed in claim 1 further comprising the step of using the results of said method to aid hydrocarbon recovery from a reservoir.

17. The method as claimed in claim 1 further comprising the step of using the estimated changes having occurred between said first time and said second time in the prediction of the future evolution of said subsurface volume.

18. A non-transitory computer-program product comprising a computer-usable medium having computer-readable program code embodied therein, the computer-readable program code adapted to be executed to implement a method comprising the steps of claim 1.

* * * * *